(12) United States Patent
Montminy et al.

(10) Patent No.: US 9,062,887 B2
(45) Date of Patent: Jun. 23, 2015

(54) MODULAR HEATING, VENTILATING, AIR CONDITIONING, AND REFRIGERATION SYSTEMS AND METHODS

(75) Inventors: Jeffrey E. Montminy, Riverview, FL (US); Varun Prem Sagar Rajasekaran, Parrish, FL (US); Steven Eugene Bivens, St. Petersburg, FL (US); Lenim E. Alcantara, Ruskin, FL (US)

(73) Assignee: HOBART BROTHERS COMPANY, Troy, OH (US)

( * ) Notice: Subject to any disclaimer, the term of this patent is extended or adjusted under 35 U.S.C. 154(b) by 390 days.

(21) Appl. No.: 12/884,859

(22) Filed: Sep. 17, 2010

(65) Prior Publication Data

US 2011/0113795 A1    May 19, 2011

Related U.S. Application Data

(60) Provisional application No. 61/262,754, filed on Nov. 19, 2009.

(51) Int. Cl.
| | |
|---|---|
| *F25D 19/00* | (2006.01) |
| *F25B 1/06* | (2006.01) |
| *F25B 25/00* | (2006.01) |
| *F24F 1/02* | (2011.01) |
| *B64F 1/36* | (2006.01) |
| *F24F 3/06* | (2006.01) |

(52) U.S. Cl.
CPC .............. *F24F 1/025* (2013.01); *B64F 1/364* (2013.01); *F24F 3/065* (2013.01); *F24F 2221/36* (2013.01)

(58) Field of Classification Search
CPC .......... F24F 2221/36; F24F 13/20; F24F 1/02

USPC ............... 62/298, 498, 499, 332, 237, 507; 165/122, 127; 29/890.07
See application file for complete search history.

(56) References Cited

U.S. PATENT DOCUMENTS

| 2,349,683 A | * | 5/1944 | Sperry ........................ 165/125 |
| 2,894,375 A | * | 7/1959 | Waterfill ..................... 62/196.4 |
| 2,943,455 A | * | 7/1960 | Reverman, Jr. ................... 62/77 |
| 4,852,362 A | | 8/1989 | Conry |

(Continued)

FOREIGN PATENT DOCUMENTS

| CN | 2177187 | 9/1994 |
| CN | 101005987 | 7/2007 |

(Continued)

OTHER PUBLICATIONS

International Search Report for application No. PCT/US2010/056817 mailed Feb. 21, 2011.

(Continued)

*Primary Examiner* — Frantz Jules
*Assistant Examiner* — Steve Tanenbaum
(74) *Attorney, Agent, or Firm* — Fletcher Yoder P.C.

(57) ABSTRACT

Embodiments of a modular air conditioning (AC) unit include a base unit and a blower selected from a group of blowers configured for different cooling capacities. The module AC unit also includes at least one heat exchanger unit selected from a group of substantially identical modular heat exchanger units, the number of heat exchanger units being selected based upon the desired cooling capacity. The at least one heat exchanger unit and the blower are assembled to the base unit to form a modular air conditioning circuit.

20 Claims, 15 Drawing Sheets

(56) References Cited

U.S. PATENT DOCUMENTS

| | | | |
|---|---|---|---|
| 5,031,690 A | 7/1991 | Anderson et al. | |
| 5,383,335 A * | 1/1995 | Anderson et al. | 62/89 |
| 5,551,508 A | 9/1996 | Lim et al. | |
| 6,240,742 B1 | 6/2001 | Kaufman et al. | |
| 6,460,356 B1 | 10/2002 | Tao | |
| 6,491,094 B2 | 12/2002 | Rayburn | |
| 6,662,590 B2 * | 12/2003 | Kamuf | 62/428 |
| 6,755,035 B1 | 6/2004 | McNamara | |
| 6,763,669 B1 | 7/2004 | Bushnell | |
| 6,819,563 B1 * | 11/2004 | Chu et al. | 361/696 |
| 6,988,538 B2 * | 1/2006 | Merkys et al. | 165/122 |
| 8,331,086 B1 | 12/2012 | Meissner | |
| 2004/0094289 A1 * | 5/2004 | Harshberger et al. | 165/48.1 |
| 2005/0087329 A1 * | 4/2005 | Zhang et al. | 165/104.33 |
| 2006/0037953 A1 | 2/2006 | Matthews et al. | |
| 2007/0209383 A1 * | 9/2007 | Hutton | 62/434 |
| 2008/0307813 A1 * | 12/2008 | Lifson et al. | 62/228.4 |
| 2009/0084120 A1 | 4/2009 | Meier | |
| 2009/0107159 A1 | 4/2009 | Mann, III et al. | |
| 2009/0107160 A1 | 4/2009 | Montminy et al. | |
| 2009/0107657 A1 | 4/2009 | Montminy et al. | |
| 2009/0108549 A1 | 4/2009 | Montminy et al. | |
| 2009/0108552 A1 | 4/2009 | Mann, III et al. | |
| 2009/0110471 A1 | 4/2009 | Montminy et al. | |
| 2009/0112368 A1 | 4/2009 | Mann, III et al. | |
| 2009/0121552 A1 | 5/2009 | Mann, III et al. | |
| 2010/0132390 A1 * | 6/2010 | Platt et al. | 62/238.7 |

FOREIGN PATENT DOCUMENTS

| | | |
|---|---|---|
| CN | 101351383 | 1/2009 |
| DE | 20313048 U1 | 2/2004 |
| GB | 1276454 A | 6/1972 |
| JP | 1189435 | 7/1989 |
| JP | 2000198349 | 7/2000 |
| WO | 2007061622 A1 | 5/2007 |

OTHER PUBLICATIONS

International Search Report for application No. PCT/US2010/056854 mailed Feb. 21, 2011.

International Search Report for application No. PCT/US2011/022139 mailed Apr. 29, 2011.

International Search Report for application No. PCT/US2011/052001 and PCT Written Opinion mailed Dec. 27, 2011.

International Search Report for application No. PCT/US2010/035950 mailed Oct. 27, 2010.

* cited by examiner

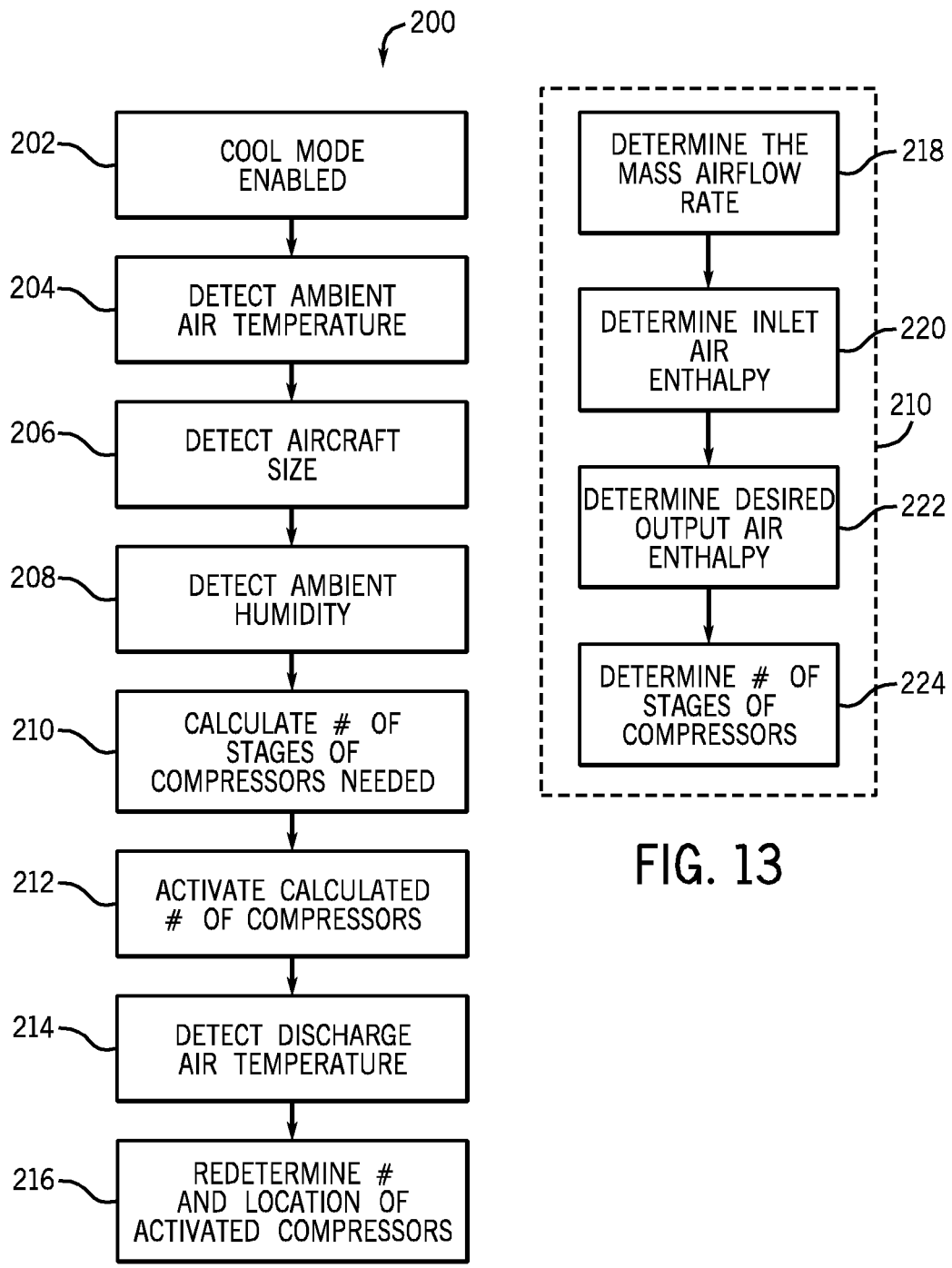

MODULAR HEATING, VENTILATING, AIR CONDITIONING, AND REFRIGERATION SYSTEMS AND METHODS

CROSS REFERENCE TO RELATED APPLICATIONS

This application is a Non-Provisional Patent Application of U.S. Provisional Patent Application No. 61/262,754 entitled "Modular Configurable Fixed or Mobile Air Conditioning Unit Comprising An Air Handling Module and Multiple Heat Exchanger Modules", filed Nov. 19, 2009, which is herein incorporated by reference.

BACKGROUND

The invention relates generally to heating, ventilation, air conditioning, and refrigeration (HVACR) systems, and, more particularly, to modular HVACR systems.

HVACR systems are utilized for a variety of applications that require the temperature and quality of surrounding air to be regulated. For example, HVACR systems are utilized to provide ventilation, to filter air, and to maintain desirable pressure relationships for buildings, aircraft, and so forth. For further example, HVACR systems may be provided on a ground support equipment cart to serve aircraft parked at gates. As such, HVACR systems typically include a refrigeration cycle that includes various heat exchangers that cooperatively function to output the desired air stream. Such heat exchangers are typically provided as integral components of the HVACR unit.

Unfortunately, in many traditional systems, if a single internal component, such as a condenser or an evaporator malfunctions, the entire HVACR system must be shut down until the malfunction is repaired or a broken part is replaced. In some industries, such a situation may result in lost productivity due to the resulting downtime. Furthermore, existing HVACR systems are typically configured for a single maximum output capacity. If an output capacity that exceeds the maximum output rating of the purchased HVACR system is desired after purchasing the HVACR system, an operator must replace the unit. However, such replacement may impose high monetary costs and require additional training prior to operation. Accordingly, there exists a need for improved HVACR systems that overcome such drawbacks associated with traditional systems.

BRIEF DESCRIPTION

In an exemplary embodiment, a modular air conditioning (AC) unit includes a base unit, a blower selected from a group of blowers configured for different cooling capacities, the blower being mounted on the base unit. The modular AC unit also includes at least one evaporator unit selected from a group of substantially identical modular evaporator units, the number of evaporator units being selected based upon the desired cooling capacity. The at least one evaporator unit is assembled to the base unit. The modular AC unit also includes at least one condenser unit selected from a group of substantially identical modular condenser units, the number of condenser units being selected based upon the desired cooling capacity. The at least one condenser unit is assembled to the base unit and to the evaporator unit to form a modular refrigeration circuit.

In another embodiment, a method of assembling a modular air conditioning (AC) unit includes selecting a base unit from a group of base units configured to receive substantially different arrangements or numbers of components and selecting a blower from a group of blowers configured for different cooling capacities. The method also includes selecting at least one evaporator unit from a group of substantially identical modular evaporator units, the number of evaporator units being selected based on the desired cooling capacity. The method also includes selecting at least one condenser unit from a group of substantially identical modular condenser units, the number of condenser units being selected based on the desired cooling capacity and assembling the selected base unit, the selected at least one evaporator unit, and the selected at least one condenser unit together to form a modular air conditioning circuit.

In another embodiment, a modular air conditioning (AC) unit includes a base unit, a blower selected from a group of blowers configured for different cooling capacities, the blower being mounted to the base unit, and at least one heat exchanger unit selected from a group of substantially identical modular heat exchanger units. The number of heat exchanger units is selected based upon the desired cooling capacity, and the at least one heat exchanger unit is assembled to the base unit to form a modular air conditioning circuit.

DRAWINGS

These and other features, aspects, and advantages of the present invention will become better understood when the following detailed description is read with reference to the accompanying drawings in which like characters represent like parts throughout the drawings, wherein:

FIG. 12 illustrates exemplary logic for operating the modular AC unit in cooling mode;

FIG. 13 illustrates an exemplary method for calculating a number of necessary compressor stages during the cooling mode startup in accordance with aspects of the present invention;

DETAILED DESCRIPTION

As described in detail below, embodiments of a modular HVACR system are provided. The modular system may include one or more substantially identical condenser and evaporator modules that are adapted to be coupled together with an appropriate blower module and base unit to cooperatively function to generate a desired output air capacity, as desired by an operator. As such, presently contemplated embodiments of the evaporator, condenser, and blower modules may be adapted to function together in a variety of system configurations. Further, the condenser modules may be adapted to facilitate proper airflow through the condenser module when operating as part of the modular system. As such, embodiments of the condenser module may include micro-channel condensers, dividers, fans, and so forth, appropriately coupled together to establish the desired airflow paths.

The modularity of the disclosed systems offers advantages over traditional non-modular systems. For example, the modularity of the disclosed systems may allow for increased system efficiency and responsiveness as well as decreased system downtime as compared to traditional non-modular systems. Such modularity may be based upon use of self-similar evaporator and condenser modules that can be associated with one another in various combinations. The combinations may provide redundancy, accommodate temporary or longer-term changing capacity needs (lower or higher), and may allow for field-changeable configurations, such as to interchangeably provide a lower output air capacity or a higher output air capacity depending upon the application needs. The resulting systems may be used in a wide range of applications, but are particularly well suited to temporarily supplying conditioned air to aircraft and other non-permanent installations. While the modular systems described below are not presented as specifically including their own dedicated power sources, they may draw power from the power grid, when available, but may also be provided with power from generators (e.g., engine-driven equipment) and other power sources.

It should be noted that the modular air conditioning units described herein may be designed to deliver any of a variety of types of conditioned air, such as air which has been cooled, filtered, and/or otherwise conditioned (e.g., heated). As such, the modular AC unit may be configured to cool incoming air, heat incoming air or otherwise condition the incoming air. Accordingly, as used herein, the term "conditioned air" is not meant to be construed only as cooled air, but rather is meant to refer to air conditioned in any of a variety of suitable ways Likewise, the term "conditioning unit" is not meant to limit embodiments of the invention to units that cool air, but rather is meant to encompass units that condition air in a variety of suitable ways.

Figure 1:
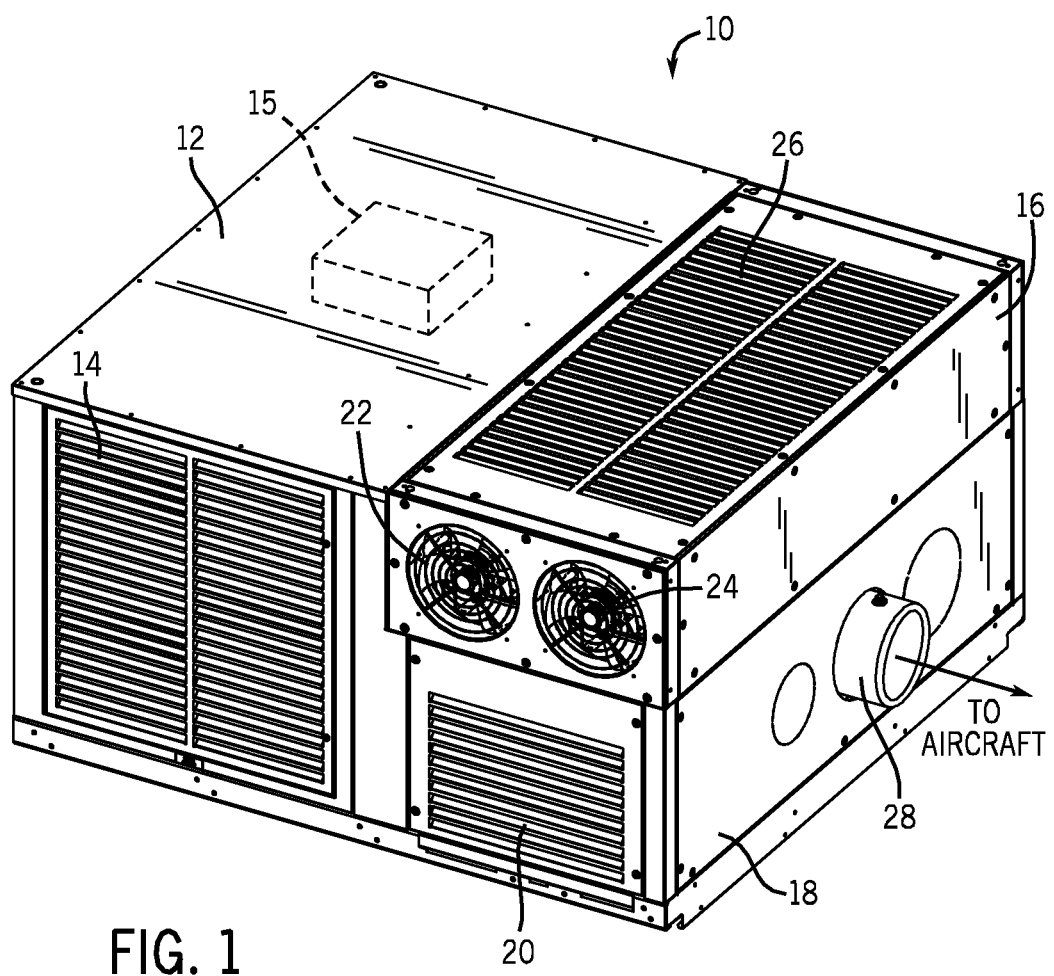
FIG. 1 is a perspective view of an exemplary modular air conditioning (AC) unit that is configurable to output any of a range of conditioning capacities.

Turning now to the drawings, FIG. 1 is a perspective view of a modular air conditioning (AC) unit 10 that is configurable to output any of a range of conditioning capacities. For example, the module AC unit 10 may be configurable for a 30 ton refrigeration capacity, a 60 ton refrigeration capacity, a 90 ton refrigeration capacity, a 120 ton refrigeration capacity, or any other suitable air conditioning capacity. As such, in the illustrated embodiment, the modular AC unit 10 includes a blower module 12 including louvers 14 and an internal controller 15, a condenser module 16, and an evaporator module 18 including louvers 20. The condenser module 16 includes a first fan 22, a second fan 24, and louvers 26, although additional fans may also be provided, for example, a third fan and a fourth fan located on a back side of the condenser module 16. A hose connection 28, which may couple the modular AC unit 10 to a downstream device (e.g., an aircraft), is coupled to the evaporator module 18 in the illustrated embodiment, but may be located in any suitable location on the modular AC unit 10 in other embodiments.

During operation, the modular AC unit 10 is adapted to receive incoming air, condition such air, and output the conditioned air for use in a desired downstream application. For example, in one embodiment, the modular AC unit 10 may be located on a ground support equipment cart for an aircraft and, accordingly, may output the conditioned air to an associated aircraft via connection 28. As such, the modular AC unit 10 may be adapted to function as a refrigeration circuit, thus receiving ambient air and outputting cooled air. To that end, during use, the blower unit 12 receives and circulates incoming air. The condenser module 16 and the evaporator module 18 cooperate to function as a heat exchanger module. For example, the blower module 12, the condenser module 16, and the evaporator module 18 function in a refrigeration cycle, which utilizes a vapor-compression cycle to generate conditioned air. In such embodiments, the condenser module 16 receives a refrigerant and subsequently removes heat from the refrigerant by condensing the vaporized refrigerant into a liquid. Additionally, the evaporator module 18 vaporizes a received refrigerant, absorbing heat due to the latent heat of vaporization and cooling the ambient air moved over the evaporator coils by the blower.

Figure 2:
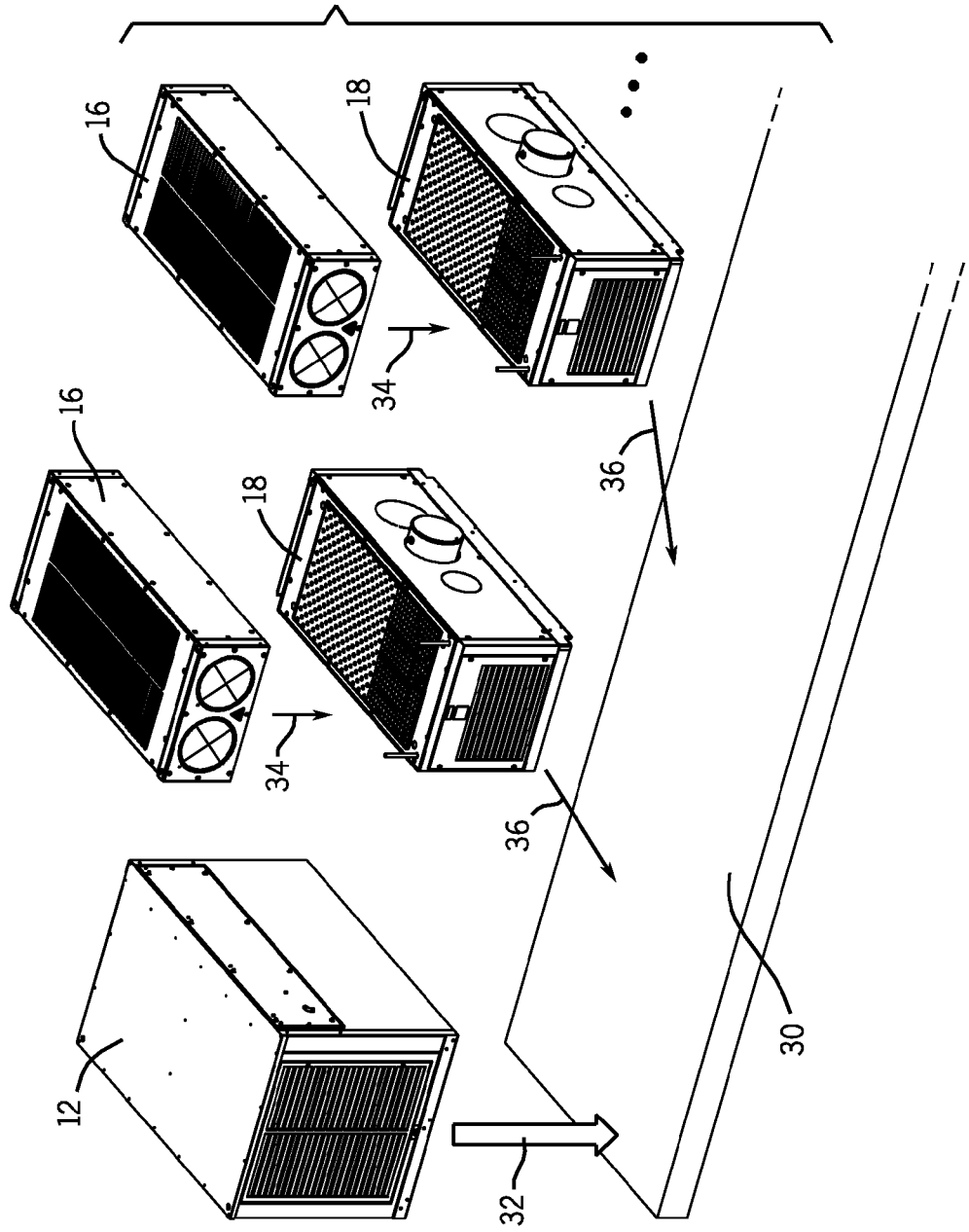
FIG. 2 illustrates an exemplary assembly process for a modular AC unit in accordance with aspects of the present invention.

The embodiment illustrated in FIG. 1 includes one blower module 12, one condenser module 16, and one evaporator module 18. However, as shown in FIG. 2, the modular AC unit 10 may include any number of substantially identical condenser modules 16 and any number of substantially identical evaporator modules 18. Specifically, FIG. 2 illustrates a base unit 30 that is adapted to receive the appropriate number of components to achieve the desired output air capacity. For example, in the illustrated embodiment, the base unit 30 is adapted to receive the blower module 12, as indicated by arrow 32. The substantially identical condenser modules 16 are adapted to be received by the substantially identical evaporator modules 18, as indicated by arrows 34, and the base unit 30 is configured to receive the substantially identical evaporator modules 18, as indicated by arrows 36.

As indicated in FIG. 2, any number of substantially identical condenser modules 16 and any number of substantially identical evaporator modules 18 may be mounted to the base unit 30 to achieve the desired output. That is, embodiments of the present invention facilitate formation of a modular AC unit with any of a variety of suitable output capacities by allowing an operator to couple an appropriate blower module with a suitable number of evaporator modules and condenser modules. For instance, the user may couple additional condenser modules and additional evaporator modules to the base unit to increase the output capacity of the modular AC unit until the maximum capacity of the blower module has been reached. Subsequently, if an even greater output capacity is desired, the user may replace the blower module with another blower module of increased capacity and add additional condenser and evaporator modules as desired. Still further, in some embodiments, the evaporator unit and the condenser unit may be provided as a single modular assembly. That is, in certain embodiments, a modular heat exchanger module may be provided. In such embodiments, the modular heat exchanger module may be configured to function both as an evaporator and as a condenser.

It should be noted that embodiments of the present invention may include multiple base units 30 from which an operator may choose the appropriate base size for the given application. For example, each base unit may be adapted to receive a predetermined number of condenser and evaporator modules and, thus, may have an associated maximum output capacity. If an increase in the desired output capacity beyond the maximum output capacity supported by the chosen base unit is desired, a new base unit may be chosen to accommodate the additional condenser and evaporator modules. Furthermore, it should also be noted that the base unit 30 of FIG. 2 is exemplary, and a variety of advantageous modifications may be made to such a unit during implementation. For example, the base unit 30 may include wheels that impart the modular AC unit with mobility. For further example, the base unit 30 may be configured for use in a stand mounted, bridge mounted, towable, or truck/heavy vehicle mounted configurations.

The modularity of the modular AC unit 10 offers distinct advantages over non-modular systems. For example, while non-modular systems may limit the operator to a fixed maximum output capacity, presently disclosed modular AC systems are configurable for a variety of output capacities since additional modules may be added as needed. For further example, since each modular unit is substantially identical, the modularity of the system may allow for easy replacement or repair of malfunctioning modules. If a malfunction is identified in a module, the module may be replaced with a substantially identical module of the same type while the original module is repaired. As such, the modular AC systems disclosed herein may allow for repair of malfunctions without the need for system downtime.

In the embodiments illustrated in FIGS. 1 and 2, the blower module 12 is shown mounted to a left side portion of the base unit 30, and the condenser modules 16 are shown mounted on top of the evaporator modules 18. However, it should be noted that in other embodiments, different configurations of the modular AC unit 10 may be realized in which such components are coupled together in various other ways. For example, in one embodiment, the blower may be located beneath the condenser modules and the evaporator modules, and the base unit 30 may be configured to directly contact only the blower module. Such an embodiment may be advantageous in applications involving space constraints. Indeed, it should be noted that any suitable arrangement of the various modules on any appropriate base unit may be employed in further embodiments.

Figure 3:
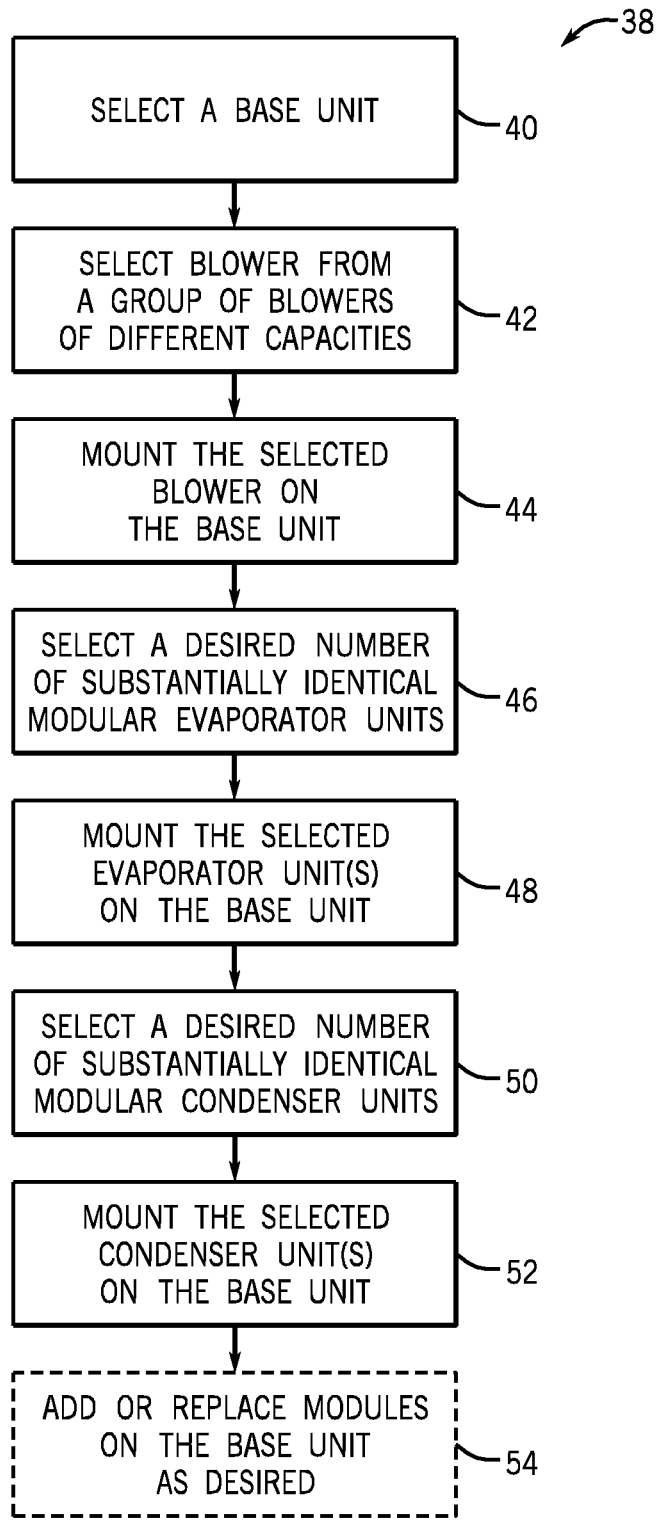
FIG. 3 illustrates an exemplary method of assembling the modular AC unit of FIGS. 1 and 2 to meet the desired output air conditioning capacity.

FIG. 3 illustrates a method 38 of assembling the modular AC unit 10 of FIGS. 1 and 2 to meet the desired output air conditioning capacity. The method 38 includes the step of selecting a base unit (block 40). As before, the base unit may be adapted for placement directly on a floor, on a set of wheels, attached to a bridge (e.g., adjacent to an aircraft), or any other suitable location. The method 38 also includes selecting a blower from a group of blowers of different output capacities (block 42) and mounting the selected blower to the base unit (block 44). The method also includes selecting a desired number of substantially identical modular evaporator units (block 46) and mounting the selected evaporator units to the base unit (block 48). The method further includes selecting a desired number of substantially identical modular condenser units (block 50) and mounting the selected condenser units to the base unit (block 52). It should be noted that in some embodiments, the evaporator units and/or the condenser units may not be mounted directly to the base unit, but rather such units may be indirectly coupled to the base unit.

The method also includes the step of adding and/or replacing modules on the base unit as needed based on the desired output capacity of the modular AC unit (block 54). That is, after the modular AC unit has been originally configured, the unit may be reconfigured to provide a different output capacity. As before, the modularity of the assembled system offers advantages over existing non-modular systems. For example, before coupling to the base unit, each modular unit may be independently assembled and tested, thereby simplifying the troubleshooting process if a malfunction occurs. For further example, since the modular AC units of different capacities have substantially the same maintenance, operational, and service training, an operator of one modular AC unit need not undergo additional training to use and/or service another modular AC unit.

Figure 4:
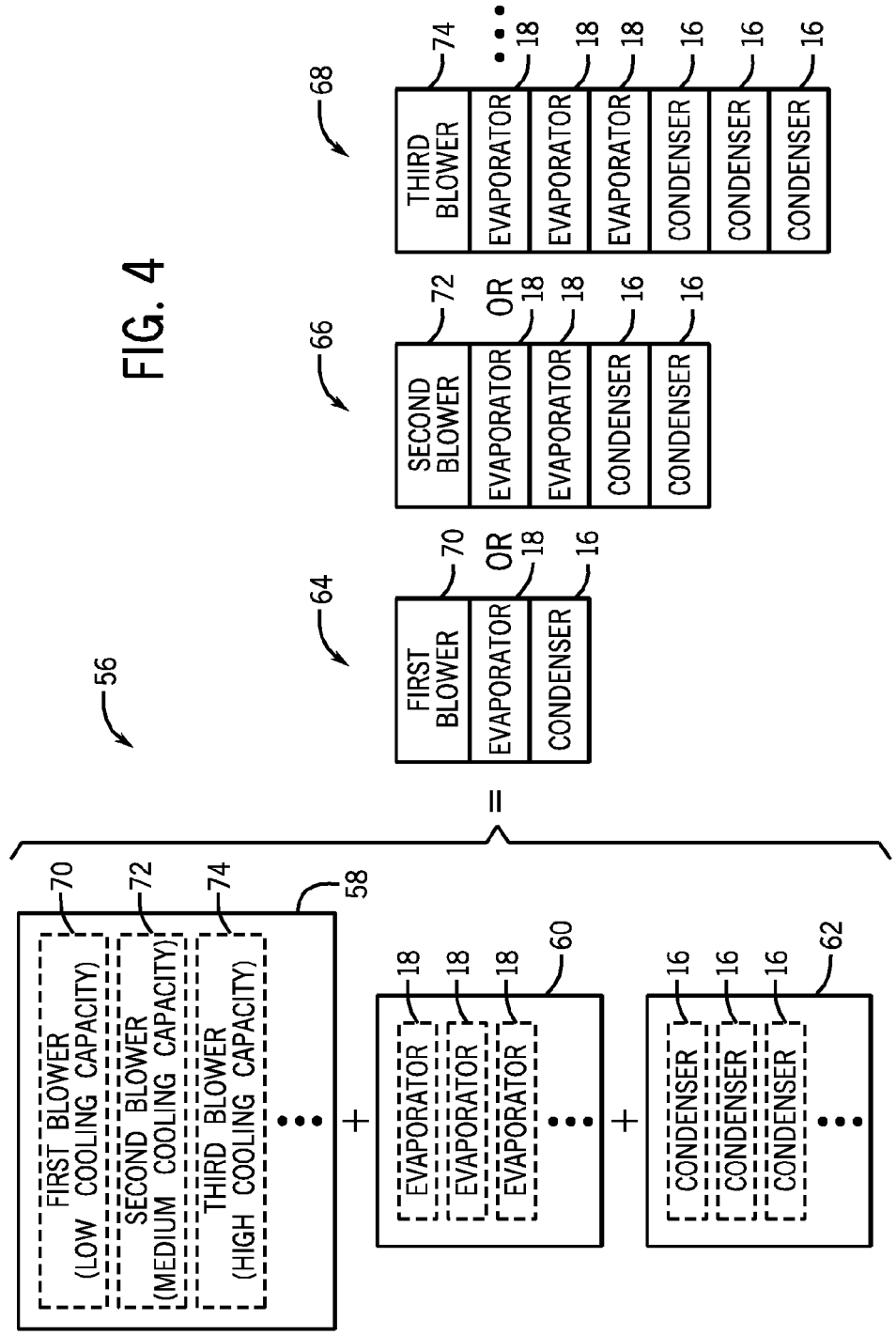
FIG. 4 is a block diagram illustrating the configurability of the modular AC unit from a group of blowers, a group of evaporators, and a group of condensers in accordance with aspects of the present invention.

FIG. 4 is a block diagram 56 further illustrating the configurability of the modular AC unit 10. The diagram 56 includes a group of blower units 58, a group of evaporator units 60, a group of condenser units 62, a first modular AC unit 64, a second modular AC unit 66, and a third modular AC unit 68. As shown, the group of blower units 58 includes a first blower 70 of a low cooling capacity, a second blower 72 of a medium cooling capacity, and a third blower 74 of a high cooling capacity. The group of evaporator units 60 includes three substantially similar evaporator modules 18, and the group of condenser units 62 includes three substantially identical condenser modules 16. However, it should be noted that additional blower modules, evaporator modules, and condenser modules may be provided in further embodiments.

As illustrated, a variety of modular AC units may be formed by coupling components of the blower group 58, the evaporator group 60 and the condenser group 62 in an appropriate manner. For example, in one embodiment, an operator may choose the first blower 70, a single evaporator module 18 and a single condenser module 16, as shown in the first modular AC unit 64. In such an embodiment, the evaporator module 18 and the condenser module 16 may collectively function as a 30 ton heat exchanger module and, accordingly, the first modular AC unit 64 may be a 30 ton nominal AC unit. For further example, in another embodiment, an operator may choose the second blower 72, two evaporator modules 18, and two condenser modules 16, as shown in the second modular AC unit 66. In such an embodiment, the evaporator modules 18 and the condenser modules 16 may collectively function as a 60 ton heat exchanger module and, accordingly, the second modular AC unit 66 may be a 60 ton nominal AC unit. Similarly, in a further embodiment, the user may choose the third blower 74, three evaporator modules 18, and three condenser modules 16 and, accordingly, the third modular AC unit 68 may be configured to function as a 90 ton nominal AC unit.

It should be noted that the blower module chosen by the user may be chosen based on the maximum desired output capacity. That is, for example, the user may choose the medium cooling capacity blower 72 but may initially only choose a single evaporator module 18 and a single condenser module 16. Such a choice may allow the operator to utilize the same blower module and base unit while adding additional evaporator and condenser units as the desired output capacity increases. Indeed, the system illustrated in FIG. 4 may allow the user to configure an appropriate modular AC unit as dictated by the anticipated or actual downstream output demand.

Figure 5:
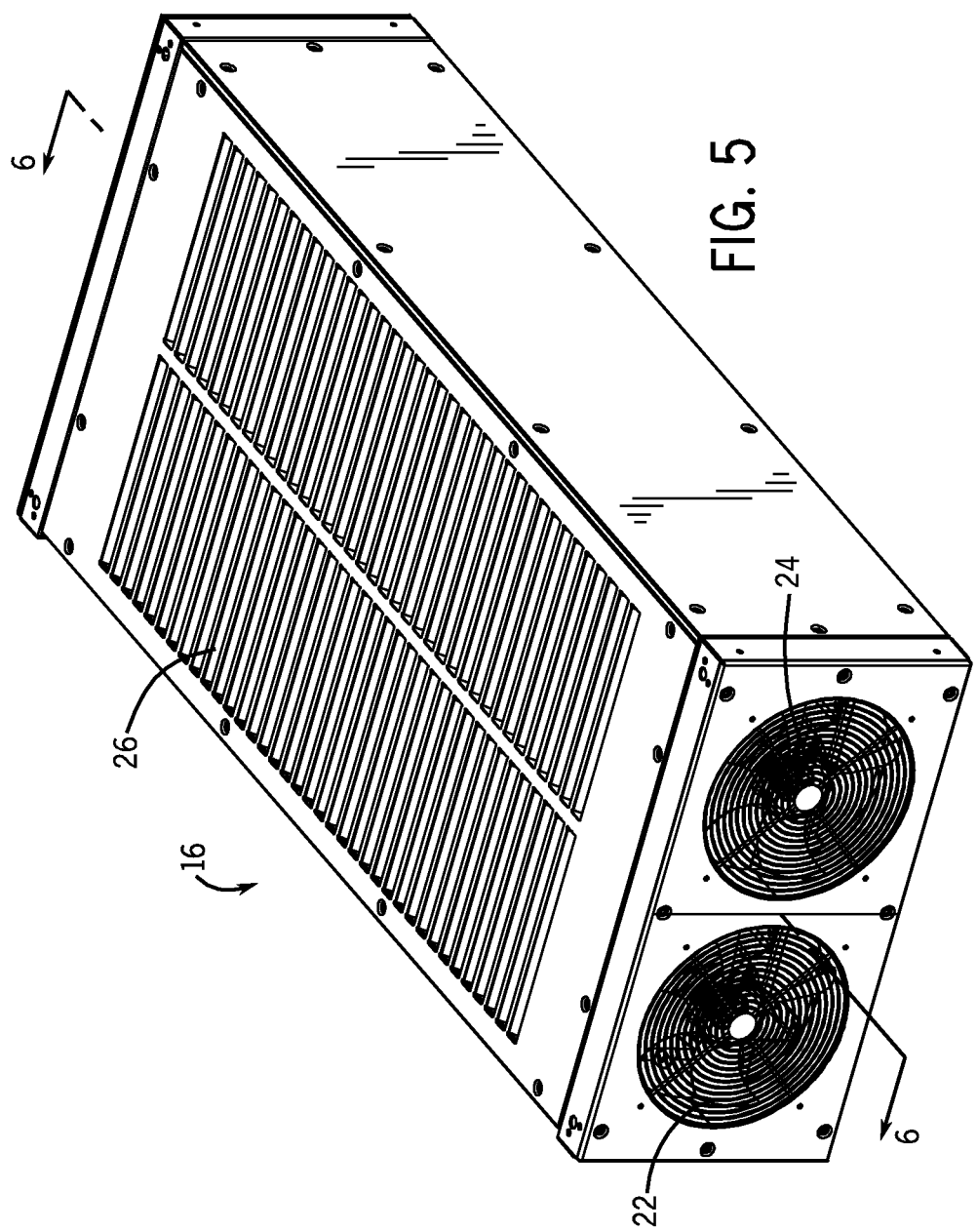
FIG. 5 is a perspective view of an exemplary condenser module in accordance with embodiments of the present invention.

FIG. 5 is a perspective view of an exemplary condenser module 16 in accordance with embodiments of the present invention. The foregoing condenser module 16 may include a variety of features that offer distinct advantages over traditional condensers designed for use in non-modular systems. For example, in some embodiments, the condenser module 16 may utilize micro-channel condenser coil technology in the condensing circuit of the condenser module 16. In such an embodiment, the micro-channel condenser components may be smaller and lighter than traditional technology (e.g., copper tubes with aluminum fins, aluminum tubes with fins, etc.), thus reducing the weight of the modular AC unit as compared to existing non-modular systems. Additionally, in some embodiments, the micro-channel condenser technology may use less refrigerant than traditional systems, thereby further reducing the size and weight of the unit and increasing unit efficiency. Still further, micro-channel condenser coils may be more resistant to damage and corrosion than traditional fin systems.

The illustrated condenser module 16 includes four fans: two front fans 22 and 24 and two back fans (not shown in FIG. 5). In some embodiments, as described in more detail below, the four fans may be independently controlled, for example, by controller 15. The foregoing feature may offer advantages over traditional systems since such control may enable each of the fans to be operated independent of the operation of the other fans. For example, in cold environments in which only a limited number of fans are necessary, the excessive fans may be turned OFF. Still further, in such embodiments, the number of activated fans may be determined based on a measured or calculated refrigerant head pressure.

Figure 6:
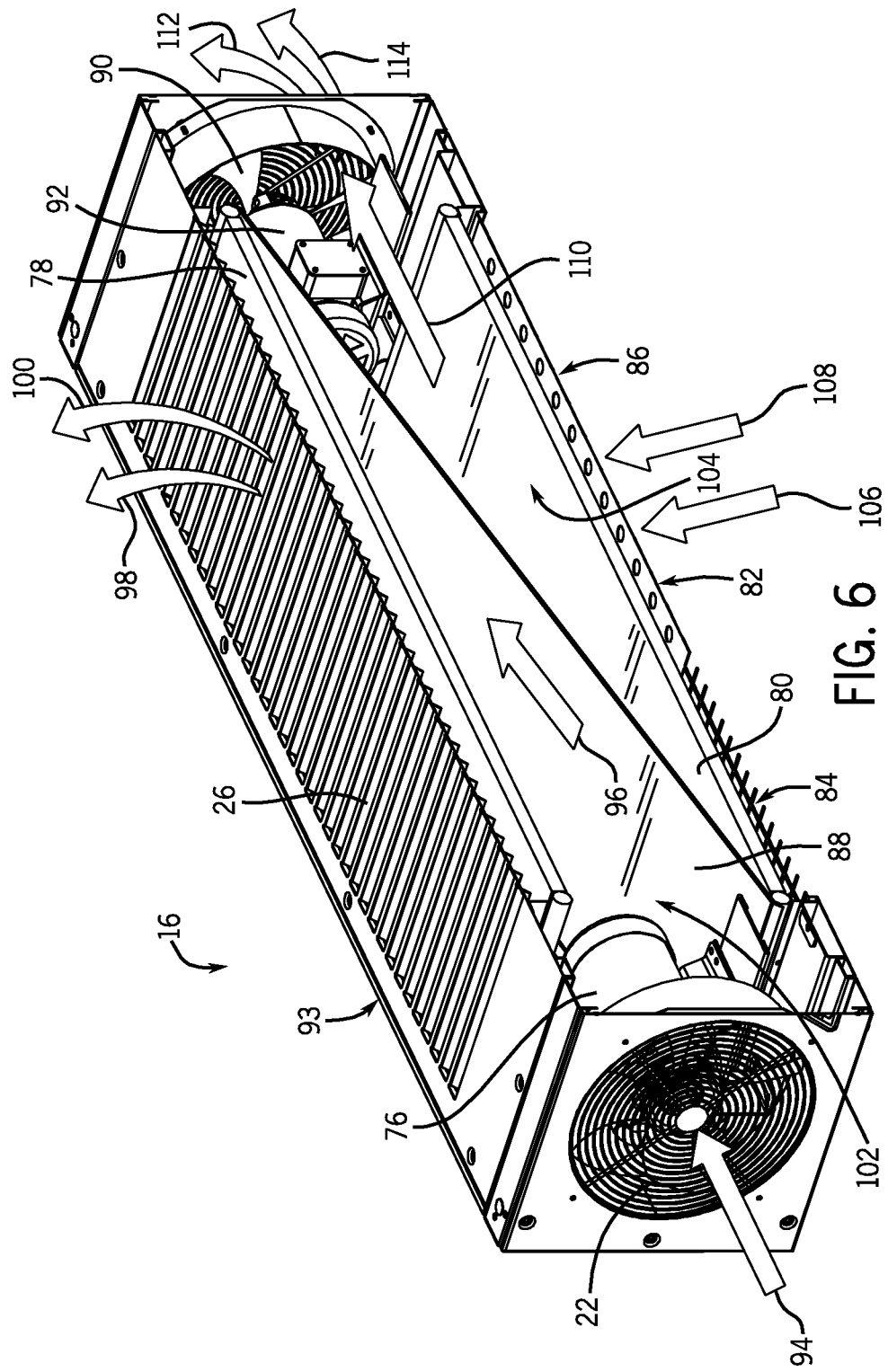
FIG. 6 is a cross-section of the exemplary condenser module taken along line 6-6 of FIG. 5.
Figure 7:
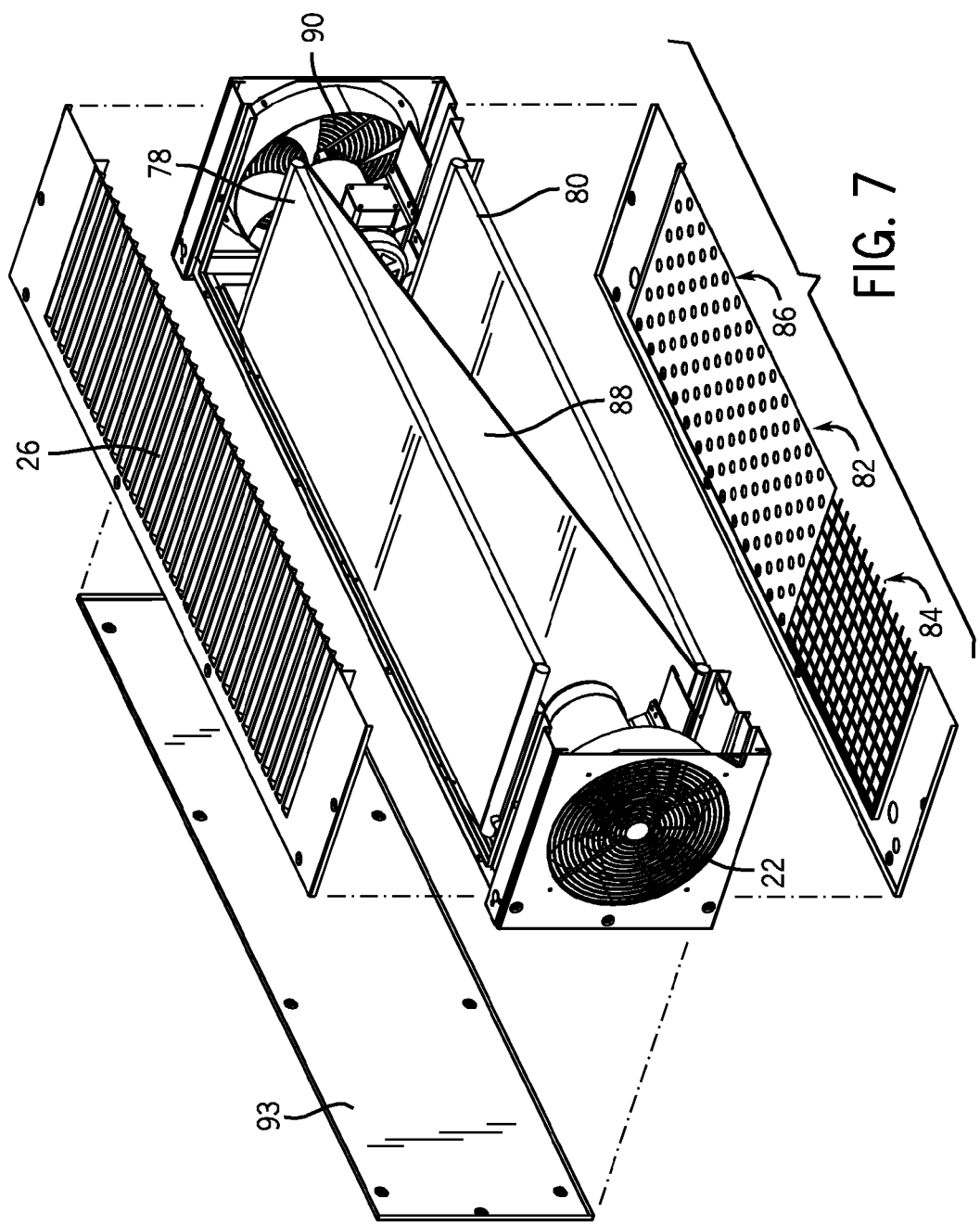
FIG. 7 is an exploded section of the exemplary condenser module of FIG. 6 in accordance with aspects of the present invention.

FIGS. 6 and 7 illustrate exemplary internal components of embodiments of the novel condenser modules 16 disclosed herein. Specifically, FIG. 6 is a section of an exemplary condenser module 16 utilizing micro-channel condenser coils taken along line 6-6 of FIG. 5. FIG. 7 illustrates an exploded section of the exemplary condenser module 16 shown in FIG. 6. As shown in the foregoing illustrations, the condenser module 16 includes the input fan 22 with a motor 76, a top condenser coil 78, louvers 26, a bottom condenser coil 80, a bottom panel 82 with a first grid portion 84 and a second grid portion 86, a divider 88, an output fan 90 with motor 92, and a side panel 93. In the illustrated embodiments, the top condenser coil 78 and the bottom condenser coil 80 are parallel to each other. However, in other embodiments, the condenser coils 78 and 80 may be positioned in any other suitable arrangement with respect to one another.

During operation, the input fan 22 establishes a first airflow path, as defined by arrows 94, 96, 98, and 100 through a first chamber 102 of the condenser module 16. As shown, the fan 22 draws air into the first chamber 102, as shown by arrow 94, through the first chamber 102 and the top condenser coil 78, as shown by arrow 96, and through the louvers 26 into the surrounding environment, as shown by arrows 98 and 100. As such, a first volume of the condenser module 16 is established between the divider 88 and the top condenser coil 78, and the first airflow path is established through the first volume.

Similarly, the output fan 90 establishes a second airflow path through a second chamber 104 of the condenser module 16, as indicated by arrows 106, 108, 110, 112, and 114. Specifically, air is drawn through the grids 84 and 86 of the bottom panel 82, as indicated by arrows 106 and 108, and through the second chamber 104, as indicated by arrow 110. The air is further circulated to the surrounding environment via openings in a covering over fan 92, as indicated by arrows 112 and 114. As such, a second volume of the condenser module 16 is established between the divider 88 and the bottom condenser coil 80, and the second airflow path is established through the second volume.

It should be noted that in some embodiments, the air drawn in through bottom panel 82, indicated by arrows 106 and 108, may be received from the evaporator module 18. In such embodiments, the air 106 and 108, after drawn through the bottom condenser coil 80 into chamber 104, may be substantially hotter than air in chamber 102. Accordingly, the bottom condenser coil 80 may be associated with the grids 84 and 86, which cooperate to approximately evenly distribute the incoming air 106 and 108 across the bottom condenser coil 80. Further, in such embodiments, the divider 88 may split the volume of the condenser module 16 into the first chamber 102 and the second chamber 104 and may substantially thermally isolate such chambers. That is, the divider 88, in some embodiments, may substantially reduce or prevent the hot air 106, 108, and 110 entering the second chamber 104 from heating up the cooler air, 94 and 96, entering the first chamber 102.

Figure 8:
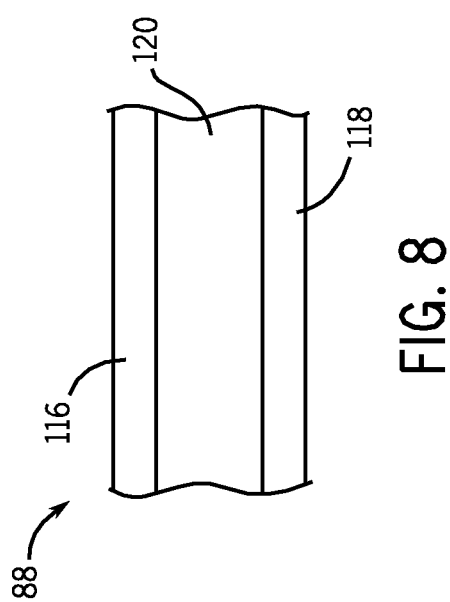
FIG. 8 illustrates a side view of a section of an exemplary divider located in the exemplary condenser module of FIG. 5.

FIG. 8 illustrates a side view of a section of an exemplary divider 88 showing one possible mechanism for maintaining separate air temperatures in the first chamber 102 and the second chamber 104. In the illustrated embodiment, the divider 88 includes a first plate 116, a second plate 118, and an insulating medium 120 disposed therebetween. During operation, the insulating medium 120 may facilitate the substantially thermal isolation of the first chamber 102 from the second chamber 104. For example, in embodiments in which the air 110 is substantially warmer than the air 96, the temperature of the air 96 may be substantially unaffected by the warmth of air 110. It should be noted that the insulating medium 120 may be any appropriate fluid, gel, solid, and so forth. For instance, in one embodiment, the insulating medium 120 may be air.

FIGS. 9-17 illustrate exemplary logic that may be employed by a controller or processor associated with the modular AC units disclosed herein. It should be noted that the controller and/or processor may be located in any suitable location in or on the modular AC unit. For example, in one embodiment, the controller or processor may be located in the blower module, as shown in FIG. 1. In such embodiments, the controller or processor may be communicatively coupled to the condenser and/or evaporator modules which may include receiving circuitry configured to receive control commands from the main controller or processor and to implement such commands in the condenser or evaporator module.

Figure 9:
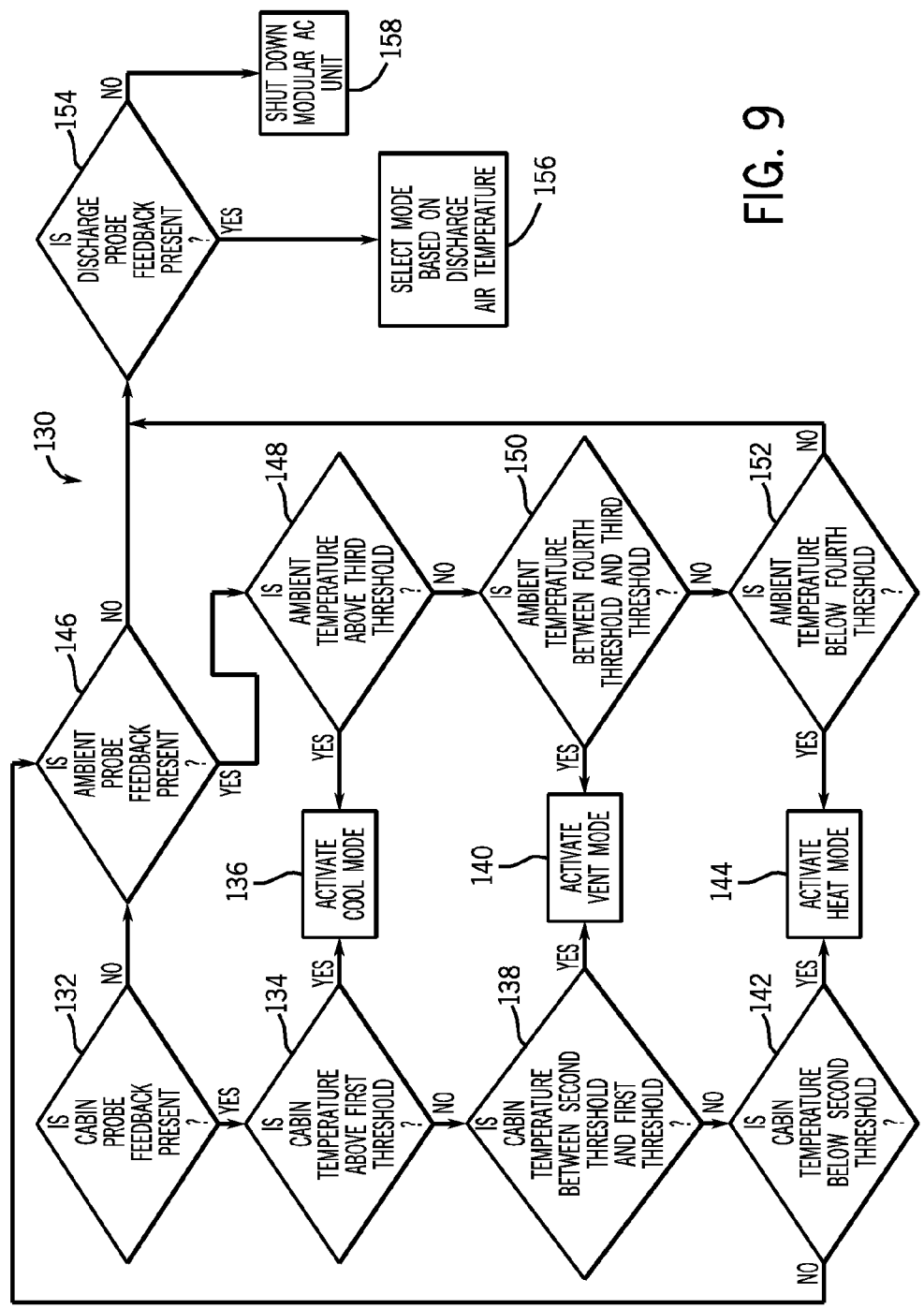
FIG. 9 illustrates exemplary control logic that may be implemented to utilize one or more of a variety of sensors located in the modular AC unit to determine an appropriate operating mode.

Specifically, FIG. 9 illustrates control logic 130 that may be implemented to utilize one or more of a variety of sensors located in the modular AC unit to determine an appropriate operating mode. Based on one or more inputs received from such probes, the controller may control the mode and operation of the modular AC unit even when one or more probes fail, as described in detail below. When the modular AC unit is in auto mode, the controller may first inquire as to whether cabin probe feedback is detected (block 132). If the cabin probe is present, the controller inquires whether the cabin temperature is above a first threshold (block 134), and if the temperature does exceed the first threshold, cool mode may be activated (block 136). For example, in one embodiment, the first threshold may be equal to approximately 73° F., and if the cabin temperature exceeds this value, the modular AC unit enters cool mode to reduce the cabin temperature.

If the cabin temperature is not above the first threshold, the controller inquires whether the cabin temperature is between a second threshold and the first threshold (block 138), and if the temperature is within this range, vent mode is activated (block 140). For example, the second threshold may be approximately 65° F., and if the cabin temperature is between 65° F. and 73° F., vent mode is activated to maintain the temperature in this range. If the temperature is outside this range, the controller may inquire if the cabin temperature is below the second threshold (block 142), and if so, heat mode is activated (block 144) to bring the cabin temperature back within the desired range. As such, if the cabin temperature probe is functioning, the cabin temperature feedback may be utilized by the controller to determine an appropriate mode of operation.

If the cabin temperature probe malfunctions and cabin probe feedback is not available, the controller inquires as to whether ambient probe feedback is available (block 146), and if so, the controller inquires as to whether the ambient temperature exceeds a third threshold (e.g., 45° F.) value (block 148). If so, cool mode is activated (block 136). If the third threshold is not exceeded, the controller checks whether the ambient temperature is between a fourth threshold (e.g., 35° F.) and the third threshold (e.g., 45° F.) value (block 150). If so, vent mode is activated (block 140) to maintain the ambient temperature in the desired range. If the ambient temperature is not within the desired range, the controller checks whether the ambient temperature is below the fourth threshold (block 152) and if so, heat mode is activated (block 144) to bring the ambient temperature back in the desired range.

If feedback is not available from the ambient temperature probe (e.g., the ambient temperature probe has malfunctioned), the controller checks for feedback from the discharge probe (block 154). If the discharge probe feedback is available, the controller selects an appropriate mode based on the detected discharge air temperature and one or more desired set points (block 156), as before. If feedback is not available from the discharge temperature probe, the controller directs the modular AC unit to shut down (block 158). As such, the controller may utilize any one of a variety of feedback probes to determine the appropriate operating mode for the modular AC unit. Accordingly, embodiments of the present invention may allow for sensor failure without the need for unit shutdown since the controller may use any of a variety of suitable probes to direct control of the modular unit.

Figure 10:
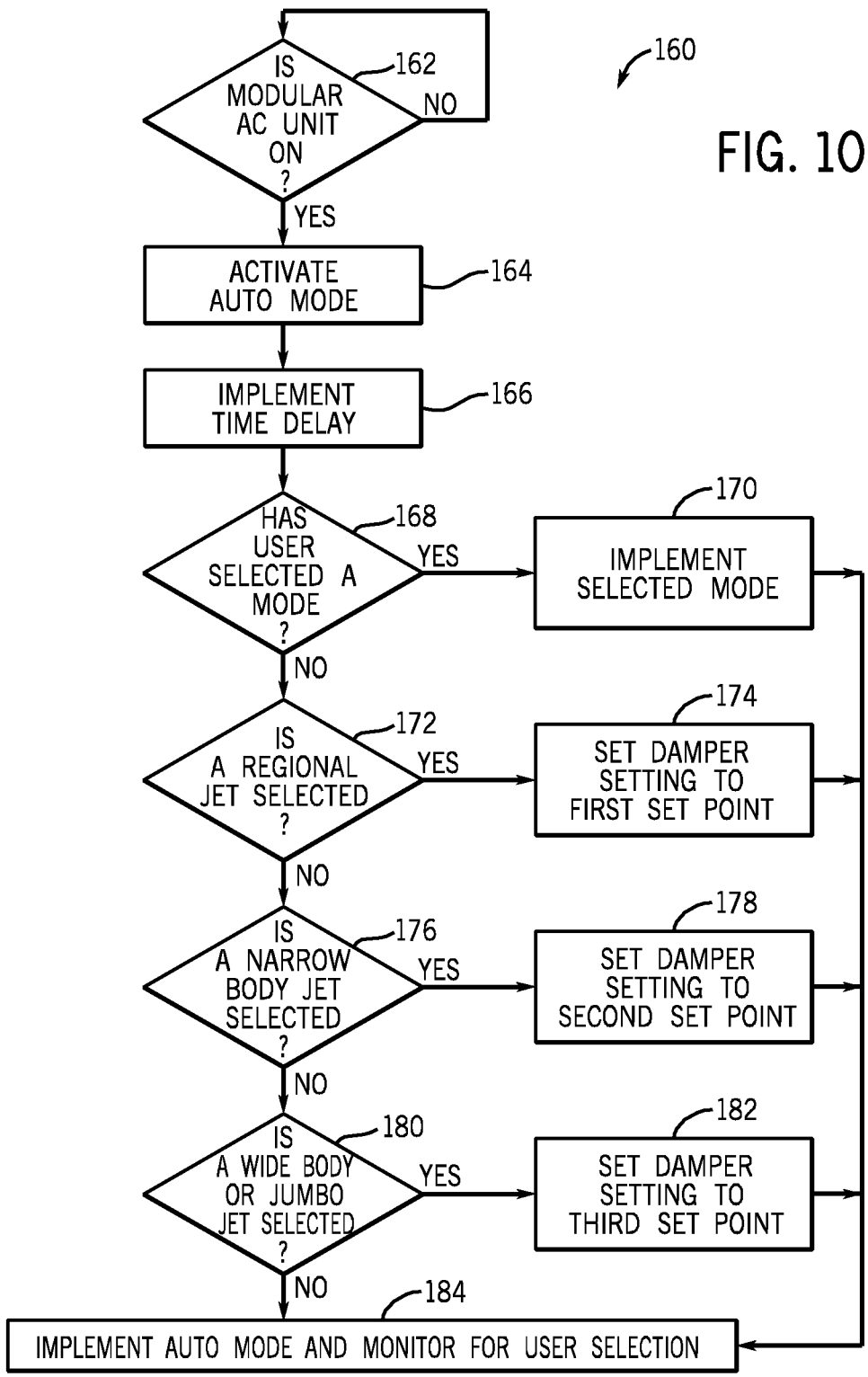
FIG. 10 illustrates exemplary operating logic that may be employed by an exemplary controller to operate the modular AC unit in vent mode.

FIG. 10 illustrates exemplary operating logic 160 that may be employed by an exemplary controller to operate the modular AC unit in auto mode. In the illustrated embodiment, the auto mode may be set as the default operating mode when the modular AC unit is powered ON. However, it should be noted that in other embodiments, other modes (e.g., heat mode, cool mode, vent mode) may be activated any time the modular AC unit is ON. In the illustrated embodiment, however, the auto mode logic 160 begins when the controller checks whether the modular AC unit is ON (block 162). When the modular AC unit is powered ON, auto mode is activated (block 164), and a time delay may be implemented (block 166). That is, once the unit is powered ON, a delay time period (e.g., 5 seconds) allows for operator selection of an alternate mode prior to implementation of the auto cycle.

As such, the controller checks for a user selected mode (block 168), and if an alternate mode (e.g., cool mode or heat mode) is selected, the controller implements the chosen mode (block 170). If the user has not selected a mode during the delay period, the controller proceeds to auto mode. In particular, the controller inquires as to whether a regional jet is selected (block 172), and if so, the controller sets the damper setting to a first set point (block 174), for example, approximately 27%. The controller further checks if a narrow body jet is selected (block 176), and if so, the controller sets the damper setting to a second set point (block 178), for example, approximately 45%. The controller further checks if a wide body or jumbo jet is selected (block 180), and if so, the controller sets the damper setting to a third set point (block 182), for example, approximately 100%. Once the damper setting has been set by the controller based on the selected aircraft, auto mode may be implemented to maintain the temperature in the desired range, and the controller may continually monitor for a change in mode (block 184).

In this way, the exemplary controllers disclosed herein may be adapted to increase the flexibility of the illustrated modular AC units as compared to traditional systems. That is, even the modular AC units of high capacities may be configured to service small aircraft by adjusting the damper setting accordingly. As such, any selected aircraft may be serviced by any modular AC unit as long as the necessary output capacity of the aircraft does not exceed the maximum operational output of the modular AC unit.

Figure 11:
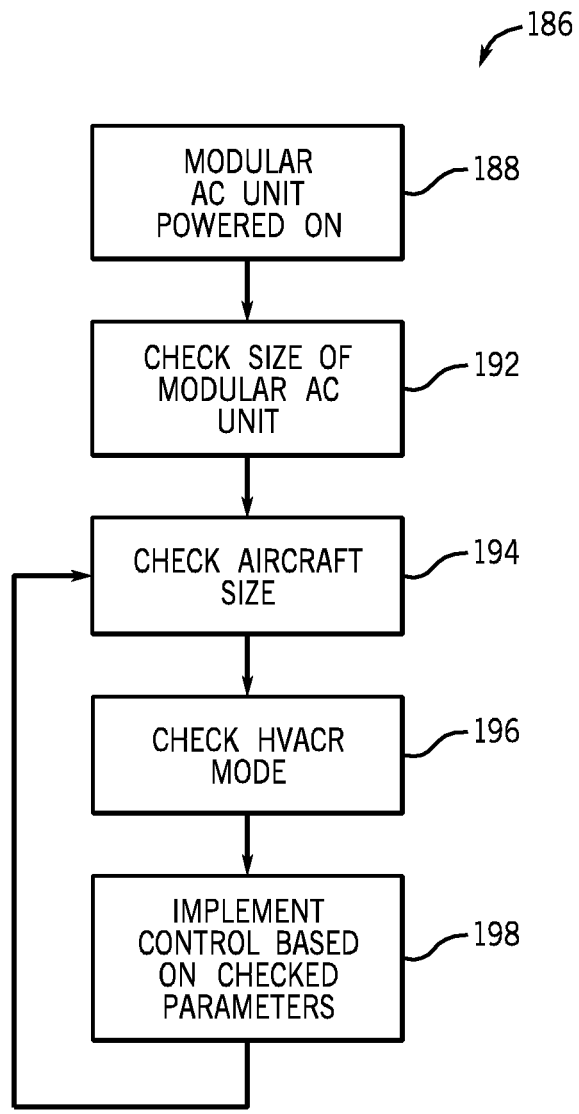
FIG. 11 illustrates an exemplary basic startup control logic sequence that may be implemented for a modular AC system to determine control of the modular unit in accordance with aspects of the present invention.

FIG. 11 illustrates control logic 186 that may be implemented for a modular AC system that considers a variety of applicable factors to determine the startup sequence of the modular unit. The modular AC unit is first powered ON (block 188) and the controller checks the size of the modular AC unit (block 192), the aircraft size selected (block 194), and the HVACR mode (block 196). Considering the aircraft type, HVACR mode, and the modular AC unit size, the controller may implement control in at least one of a heat mode, a cool mode, an auto mode, and a vent mode (block 198). For example, if cool mode has been selected, the controller may implement the logic of FIGS. 12 and 13.

The control logic 200 of FIG. 12 for cool mode begins when cool mode is enabled (block 202), for example, by user selection or automatic determination by the controller. During cool mode, the controller may be adapted to receive feedback regarding ambient air temperature (block 204), aircraft size (block 206), and ambient humidity (block 208) and to calculate the appropriate number of stages of compressors needed to achieve the desired cooling based on such feedback (block 210). Once the necessary number of stages of compressors has been calculated, the controller activates the appropriate number of compressors (block 212). Subsequently, during operation, the controller may utilize a detected discharge air temperature (block 214) to continuously update the number and location of activated compressors (block 216).

For instance, embodiments of the disclosed controller for the modular AC unit may input detected discharge air temperature into a proportional integral derivative (PID) control block to determine how many and which compressor stages should be activated to maintain the discharge air temperature at a predetermined set point (e.g., 24° F.). For further example, if the predetermined set point cannot be reached with the activated number of compressors, additional compressor stages may be activated until the desired set point is reached. The controller may also be configured to control which compressors are activated and deactivated. For example, the controller may assign an activation temperature and a deactivation temperature to each compressor. Each compressor may then be activated at the activation temperature and deactivated at the deactivation temperature.

FIG. 13 illustrates one exemplary method in which the controller may calculate the number of necessary compressor stages during the cooling mode startup. In this embodiment, the method includes determining the mass airflow rate for the given application (block 218), determining an inlet air enthalpy (block 220), determining desired output air enthalpy (block 222), and finally determining the appropriate number of stages of compressors needed for the given application based on the previously determined values (block 224). For example, in one embodiment, the number of stages of compressors may be calculated according to equation (1):

$$\#stages = [a * M_{airflow}] * [b * (H_{i,air} - H_{o,air})], \quad (1)$$

where a is an appropriate scaling constant, $M_{airflow}$ is the mass airflow rate for the given aircraft model, b is an appropriate scaling constant, $H_{i,air}$ is the inlet air enthalpy, and $H_{o,air}$ is the outlet air enthalpy. An appropriate mass airflow rate may be determined by the controller based on the operator aircraft selection and the modular AC unit size. An appropriate inlet air enthalpy may be calculated by the controller based on temperature and humidity feedback received from sensors located in the modular AC system. The air output enthalpy may be determined by the controller either via a lookup table or via direct calculation based on the unit capacity.

Figure 14:
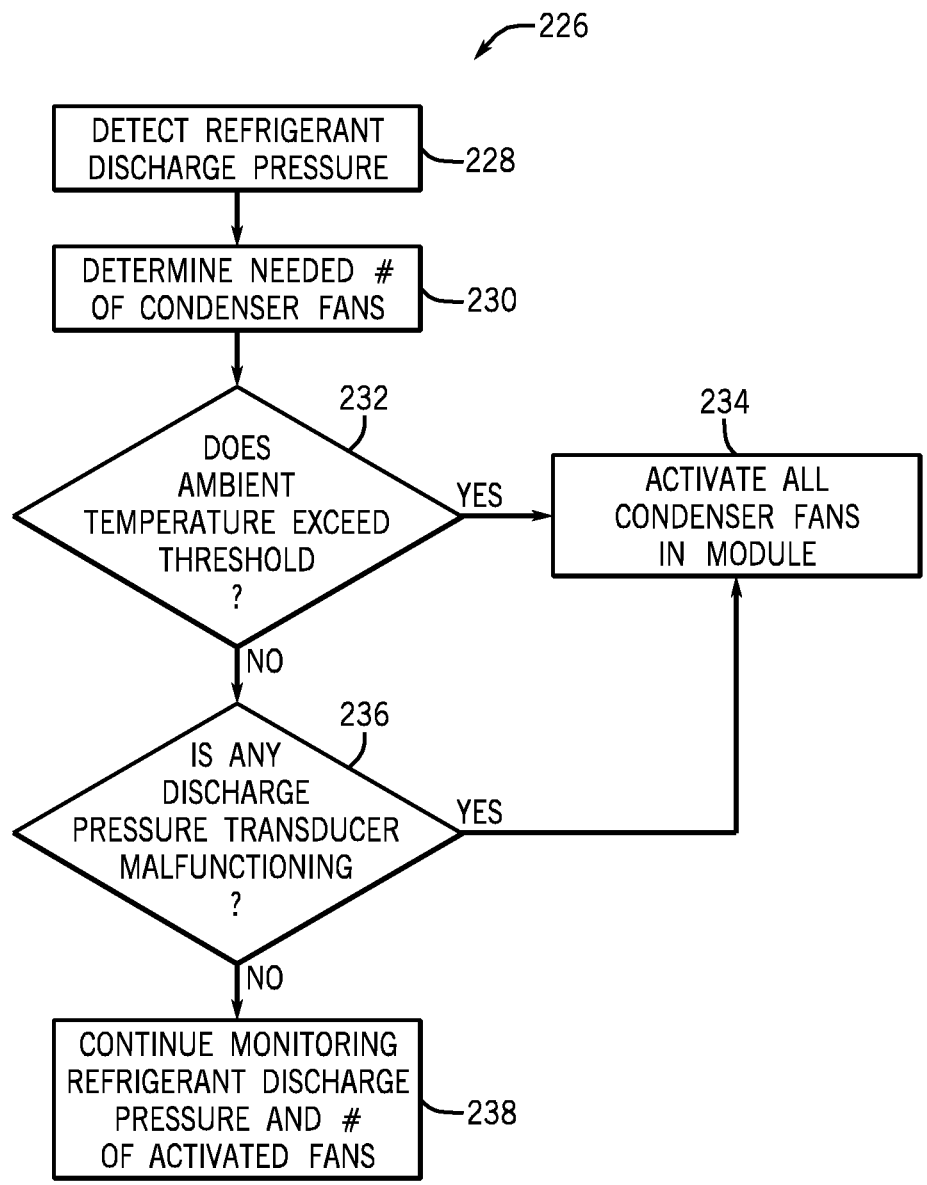
FIG. 14 illustrates an exemplary method that may be utilized by an exemplary controller to control operation of one or more condenser fans in the modular AC unit.

FIG. 14 illustrates a method 226 that may be utilized by an exemplary controller to control operation of the one or more condenser fans in the modular AC unit. The exemplary method 226 may offer distinct advantages over traditional control systems which switch the condenser fans ON and OFF as the compressor unit is activated and deactivated. For example, presently disclosed controllers may provide for individual control of each of the condenser fans independent of the activation or deactivation of the associated compressor module. As such, the exemplary controller disclosed herein may operate more efficiently than previous systems.

Specifically, the method 226 includes detecting a refrigerant discharge pressure (block 228) and determining the necessary number of condenser fans to be activated based on the detected discharge pressure (block 230). As such, embodiments of the modular AC units may include pressure transducers disposed throughout that are adapted to detect the refrigerant discharge pressure. The controller may check whether the ambient temperature exceeds a predetermined threshold (e.g., 95° F., block 232). If the ambient temperature does exceed the threshold, all the condenser fans in a given module may be activated before the compressor is activated (block 234), for example, to possibly substantially reduce or eliminate the effects of an instantaneous spike of discharge pressure when the compressor is activated in a high temperature ambient condition.

The controller may also check to determine if any of the discharge pressure transducers are malfunctioning (block 236), and if so, all the condenser fans in the module may be activated (block 234) since the pressure feedback is unreliable. The controller continues monitoring the refrigerant discharge pressure and adjusting the number of activated condenser fans in each compressor module throughout operation (block 238). Again, such a controller may facilitate unit efficiency because the condenser fans are only activated as needed. For example, such a control method allows for no fans in a compressor module to be activated if the discharge pressure is below a predetermined threshold.

Figure 15:
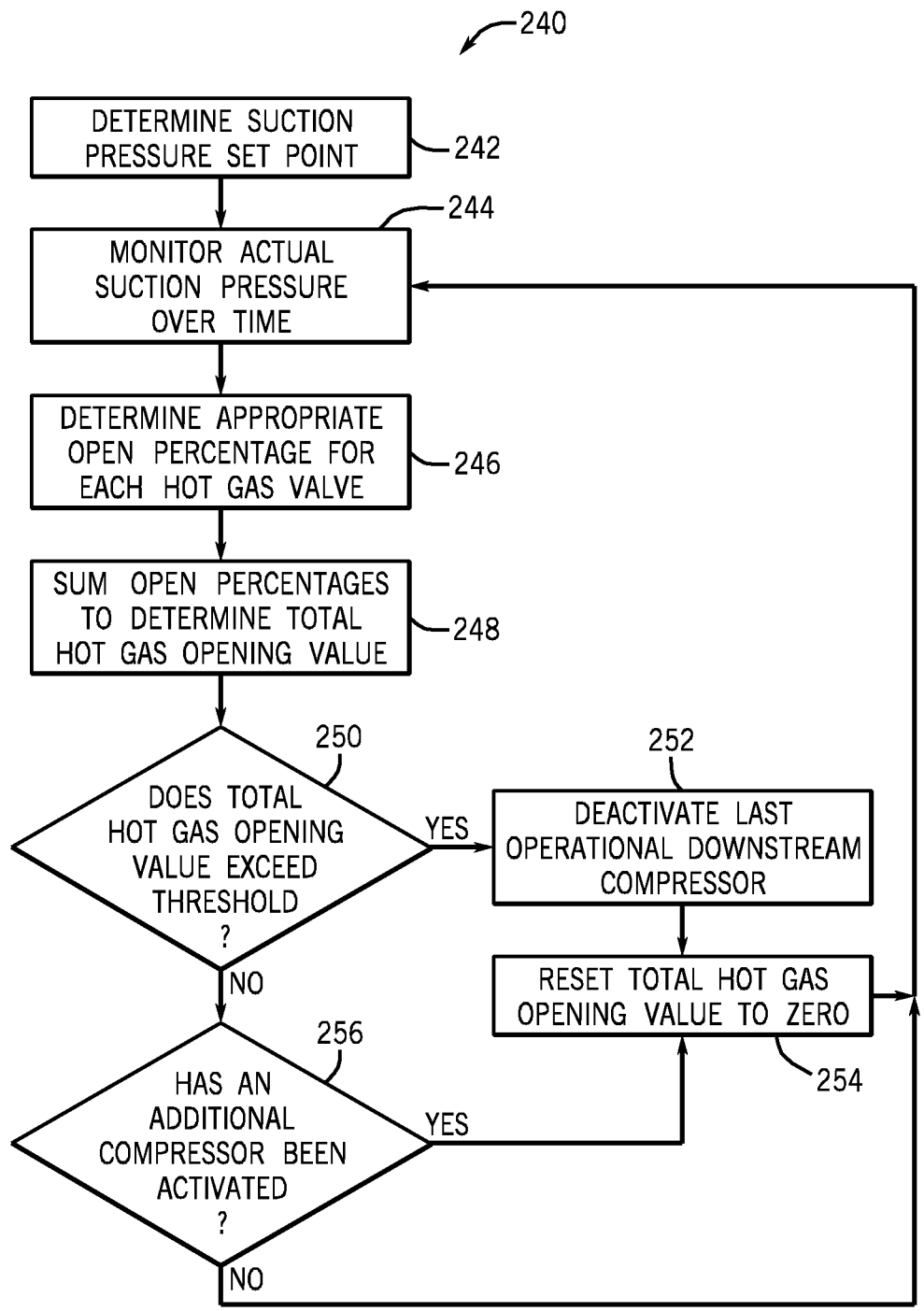
FIG. 15 illustrates an exemplary method that may be employed to optimize cooling capacity of the modular AC unit in accordance with aspects of the present invention.

FIG. 15 illustrates an exemplary method 240 that may be employed by the presently disclosed controller to control opening and closing of the hot gas valves that are configured to determine the quantity of hot gas being circulated to the evaporator coils to substantially reduce or prevent the likelihood of freezing. The method 240 includes determining a suction pressure set point (block 242) and monitoring the actual suction pressure over a given time interval (block 244) and employing proportional integral derivative (PID) control. The method 240 also includes determining an appropriate valve opening percentage for each hot gas valve based on a rate of change of suction pressure (block 246). For example, each hot gas valve may be opened anywhere between 0% and 100% to achieve the desired suction pressure set point or to maintain the actual suction pressure within a desired range.

The method 240 may further include steps to allow for the staging of the compressors to be controlled via the gas valve opening percentages. For example, the method includes the step of summing the open percentages of each of the hot gas valves to determine a total hot gas opening value (block 248). The method 240 also includes a check to determine if the calculated total gas opening value exceeds a predetermined threshold (e.g., 125%, block 250). If the threshold is exceeded, the last operational downstream compressor is deactivated (block 252), and the total hot gas opening value is reset to zero (block 254). If the threshold is not exceeded, the method 240 includes a step to check for activation of additional compressors (block 256). When an additional compressor is activated, the total hot gas opening value is again reset to zero (block 254). In this way, the controller may optimize cooling capacity to allow more efficient unit operation as compared to traditional systems.

Figure 17:
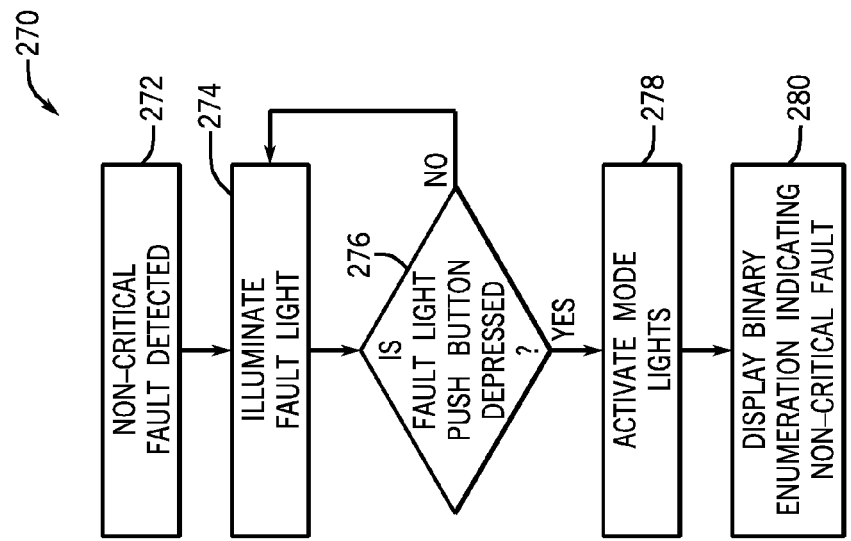
FIG. 17 illustrates an exemplary non-critical fault alerting method in accordance with aspects of the present invention.
Figure 16:
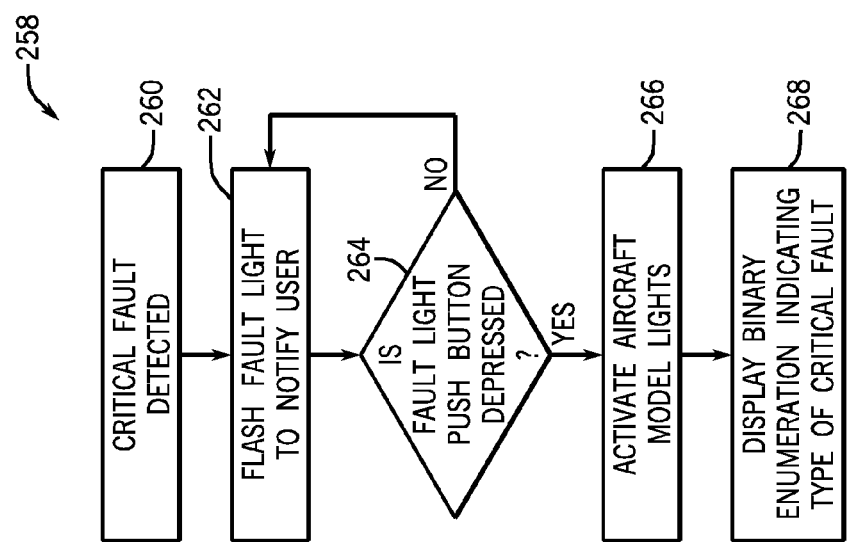
FIG. 16 illustrates an exemplary critical fault alerting method in accordance with aspects of the present invention.

FIGS. 16 and 17 illustrate methods that may be utilized by the controller to alert a user to critical and non-critical system faults, respectively. Specifically, FIG. 16 illustrates a critical fault alerting method 258. The method 258 includes detecting a critical fault (block 260) and activating a flashing fault light to notify the user that a critical fault has occurred (block 262). After alerting the user, the controller monitors the system for depression of the fault light pushbutton (block 264). If the fault light pushbutton is not depressed, the fault light continues to flash to alert the user of the error. If the user depresses the fault light pushbutton, the aircraft model lights (e.g., four lights disposed in a row) are activated (block 266). The controller then utilizes such lights to display a binary enumeration indicating the type of critical fault that has occurred (block 268). For example, in one embodiment, the user may reference a lookup table of codes that indicate the particular error based on the communicated binary enumeration. For further example, a code of 0001 may indicate an ambient probe failure, a code of 0010 may indicate a duct probe failure, and so forth.

Likewise, FIG. 17 illustrates a non-critical fault alerting method 270. The method 270 includes detecting a non-critical fault (block 272) and activating a continuously illuminated fault light to notify the user that a non-critical fault has occurred (block 274). After alerting the user, the controller monitors the system for depression of the fault light pushbutton (block 276). If the fault light pushbutton is not depressed, the fault light remains illuminated to alert the user of the error. If the user depresses the fault light pushbutton, the modular AC unit mode lights (e.g., four lights disposed in a row) are activated (block 278). The controller then utilizes such lights to display a binary enumeration indicating the type of non-critical fault that has occurred (block 280). For example, in one embodiment, the user may reference a lookup table of codes that indicate the particular error based on the communicated binary enumeration. For further example, a code of 0001 may indicate relative humidity sensor failure.

It should be noted that although in the described embodiment, the aircraft model lights are utilized to indicate critical faults and the mode lights are utilized to indicate non-critical faults, in other embodiments, such an arrangement may be reversed. Furthermore, the fault light may be configured to remain illuminated to indicate a critical fault and to flash to indicate a non-critical fault. Indeed, any of a variety of suitable ways to communicate a binary error code indicating a critical or non-critical fault to a user utilizing lights or other means located on a control panel of the modular AC unit may be employed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A modular air conditioning unit, comprising:
    a base unit selected from a group of base units configured to receive substantially different arrangements or numbers of components;
    a blower configured to be mounted on the base unit;
    an evaporator unit configured to be assembled to the base unit and comprising a housing; and
    a condenser unit configured to be mounted on a top of the housing of the evaporator unit and assembled to the base unit to form a modular refrigeration circuit, wherein the condenser unit comprises:
    a housing comprising a top panel having louvers disposed therein, a bottom panel having a distribution grid disposed therein, a first side panel, and a second side panel, wherein the housing encloses an inner chamber;
    a divider disposed within the inner chamber and configured to separate the inner chamber into a first chamber and a second chamber, and to thermally isolate the first chamber from the second chamber;
    a first condenser coil disposed in the first chamber;
    a second condenser coil disposed in the second chamber;
    an input fan disposed in the first side panel and configured to draw air from a surrounding environment into the first chamber to establish a first airflow path through the first chamber, through the first condenser coil, and through the louvers in the top panel; and an output fan disposed in the second side panel and configured to draw air from the evaporator unit into the second chamber to establish a second airflow path through the distribution grid, through the second condenser coil, and through the second side panel.

2. The modular air conditioning unit of claim 1, wherein the base unit is at least one of stand mounted, bridge mounted, and heavy vehicle mounted.

3. The modular air conditioning unit of claim 1, wherein the input fan and the output fan are configured to be controlled independent of one another.

4. The modular air conditioning unit of claim 1, wherein the first condenser coil comprises a micro-channel condenser coil.

5. The modular air conditioning unit of claim 1, wherein the divider comprises a first plate, a second plate, and an insulating medium disposed between the first and second plates.

6. The modular air conditioning unit of claim 1, wherein the first condenser coil and the second condenser coil are parallel.

7. The modular air conditioning unit of claim 1, wherein the blower is configured to intake air, to filter the air, to heat the air, and to house controls for the modular air conditioning unit.

8. A method of assembling a modular air conditioning (AC) unit, comprising:
    selecting a base unit from a group of base units configured to receive substantially different arrangements or numbers of components;
    selecting a blower from a group of blowers configured for different cooling capacities;
    selecting at least one evaporator unit from a group of substantially identical modular evaporator units, the number of evaporator units being selected based on a desired cooling capacity, wherein each of the substantially identical modular evaporator units comprises a housing;
    selecting at least one condenser unit from a group of substantially identical modular condenser units, the number of condenser units being selected based on the desired cooling capacity, and each of the substantially identical modular condenser units comprising a housing having a first chamber and a second chamber separated by a thermally isolating divider, a first condenser coil disposed in the first chamber, a second condenser coil disposed in the second chamber, and a fan configured to draw air into the condenser unit from the evaporator unit, through the second condenser coil, and into a surrounding environment; and
    assembling the selected base unit, the selected at least one evaporator unit, and the selected at least one condenser unit together to form a modular air conditioning circuit.

9. The method of claim 8, wherein selecting at least one evaporator unit comprises selecting at least two evaporator units.

10. The method of claim 9, further comprising coupling the at least two evaporator units together in series with respect to an airflow path established between the at least two evaporator units.

11. The method of claim 8, further comprising coupling the modular AC unit to an external power source.

12. The method of claim 8, further comprising coupling the at least one condenser unit to the at least one evaporator unit to form a heat exchanger module.

13. A modular air conditioning (AC) unit, comprising:
    a base unit selected from a group of base units configured to receive substantially different arrangements or numbers of components;
    a blower selected from a group of blowers configured for different cooling capacities, the blower being mounted to the base unit; and
    at least one heat exchanger unit selected from a group of substantially identical modular heat exchanger units, the number of heat exchanger units being selected based upon a desired cooling capacity, wherein each of the substantially identical modular heat exchanger units comprises:
    an evaporator unit comprising a first housing; and
    a condenser unit mounted to the evaporator unit such that a bottom surface of the condenser unit is adjacent to a top surface of the first housing, and comprising a second housing enclosing an inner chamber and being separate from the first housing, a thermally isolating divider disposed in the inner chamber to divide the inner chamber into first and second thermally isolated chambers,
    a first condenser coil disposed in the first thermally isolated chamber, a second condenser coil disposed in the second thermally isolated chamber,
    a distribution grid disposed on the bottom surface of the condenser unit and configured to distribute air from the evaporator unit across the second condenser coil, and at least one fan disposed in the second housing and configured to draw the air received from the evaporator unit into the condenser unit and through the second condenser coil.

14. The modular AC unit of claim 13, wherein the condenser unit comprises an input fan configured to establish an airflow path through the first thermally isolated chamber of the condenser unit and the first condenser coil.

15. The modular AC unit of claim 13, wherein the modular AC unit comprises at least two heat exchanger units and the at least two heat exchangers units are assembled for parallel airflow.

16. The modular AC unit of claim 13, wherein the modular AC unit comprises at least two heat exchanger units and the at least two heat exchangers units are assembled for series airflow.

17. The modular AC unit of claim 13, wherein each blower of the group of blowers is configured to provide power for operation of the modular AC unit, to filter incoming air, and to provide controls for operation of the modular AC unit.

18. The modular AC unit of claim 13, wherein the modular AC unit is a modular refrigeration circuit configured to receive ambient air, to cool the received air, and to output the cooled air.

19. The modular AC unit of claim 13, wherein the different cooling capacities comprise a 30 ton maximum nominal output, a 60 ton maximum nominal output, a 90 ton maximum nominal output, and a 120 ton maximum nominal output.

20. The modular AC unit of claim 13, wherein the base unit is at least one of stand mounted, bridge mounted, and towable.

* * * * *